(12) United States Patent
Perichaud et al.

(10) Patent No.: US 9,249,237 B2
(45) Date of Patent: Feb. 2, 2016

(54) SELF-REPAIRING COMPOSITION, SELF-REPAIRING MATERIALS, SELF-REPAIRING METHODS AND APPLICATIONS

(75) Inventors: Alain Perichaud, Marseilles (FR); Mickael Devassine, Carnoux-en-Provence (FR)

(73) Assignee: CATALYSE, Marseilles (FR)

( * ) Notice: Subject to any disclaimer, the term of this patent is extended or adjusted under 35 U.S.C. 154(b) by 690 days.

(21) Appl. No.: 12/866,990

(22) PCT Filed: Feb. 12, 2009

(86) PCT No.: PCT/FR2009/000160
§ 371 (c)(1),
(2), (4) Date: Nov. 9, 2010

(87) PCT Pub. No.: WO2009/115671
PCT Pub. Date: Sep. 24, 2009

(65) Prior Publication Data
US 2011/0057340 A1    Mar. 10, 2011

(30) Foreign Application Priority Data
Feb. 15, 2008 (FR) .................................... 08 00839

(51) Int. Cl.
| | | |
|---|---|---|
| *C08F 2/00* | (2006.01) | |
| *C08F 2/50* | (2006.01) | |
| *C08F 265/04* | (2006.01) | |
| *C08F 283/00* | (2006.01) | |
| *C08F 283/10* | (2006.01) | |
| *C08F 290/06* | (2006.01) | |
| *C08G 18/32* | (2006.01) | |
| *C08G 18/73* | (2006.01) | |
| *C08G 18/76* | (2006.01) | |
| *C08L 51/00* | (2006.01) | |
| *C08L 51/08* | (2006.01) | |

(52) U.S. Cl.
CPC ... *C08F 2/00* (2013.01); *C08F 2/50* (2013.01); *C08F 265/04* (2013.01); *C08F 283/00* (2013.01); *C08F 283/10* (2013.01); *C08F 290/06* (2013.01); *C08G 18/3215* (2013.01); *C08G 18/3228* (2013.01); *C08G 18/73* (2013.01); *C08G 18/7621* (2013.01); *C08L 51/003* (2013.01); *C08L 51/08* (2013.01); *C08L 51/085* (2013.01)

(58) Field of Classification Search
CPC ...... C08L 51/003; C08L 51/08; C08L 51/085
USPC .......................... 523/211; 257/788; 428/321.1
See application file for complete search history.

(56) References Cited

U.S. PATENT DOCUMENTS

| | | | |
|---|---|---|---|
| 6,797,107 B1 * | 9/2004 | Kotzey ........................ | 156/331.1 |
| 2001/0025015 A1 * | 9/2001 | Volker et al. ................. | 508/485 |
| 2003/0212162 A1 * | 11/2003 | Uesugi et al. .................. | 522/31 |
| 2004/0007784 A1 * | 1/2004 | Skipor et al. ................... | 257/788 |
| 2005/0165141 A1 * | 7/2005 | Wolf et al. ...................... | 524/99 |
| 2005/0250878 A1 | 11/2005 | Moore et al. | |
| 2007/0029653 A1 | 2/2007 | Lehman et al. | |
| 2007/0166542 A1 * | 7/2007 | Braun et al. ............. | 428/402.21 |

FOREIGN PATENT DOCUMENTS

WO    WO-03/002679 A1    1/2003

OTHER PUBLICATIONS

International Search Report issued in PCT/FR2009/000160, dated Jul. 31, 2009.

* cited by examiner

*Primary Examiner* — Hannah Pak
(74) *Attorney, Agent, or Firm* — Locke Lord LLP; Scott D. Wofsy; Nicholas J. DiCeglie, Jr.

(57) ABSTRACT

The invention relates to a micro-encapsulated self-repairing polymerizable composition that comprises at least one selected polymerizable compound to be integrated into organic, inorganic or composite materials for the self-repairing of damages incurred in the use conditions thereof, characterized in that micro-encapsulated polymerizable composition is integrated alone into said materials and, after the release of the microcapsule and in the absence of a catalyst, spontaneously polymerizes in the presence of a polymerization-triggering agent that is absent in said materials but naturally occurs during the use thereof, thus repairing said damages.

22 Claims, No Drawings

US 9,249,237 B2

SELF-REPAIRING COMPOSITION, SELF-REPAIRING MATERIALS, SELF-REPAIRING METHODS AND APPLICATIONS

CROSS REFERENCE TO RELATED APPLICATIONS

This application is a U.S. National Stage Application under 35 U.S.C. §371 of International Patent Application Serial No. PCT/FR2009/000160, filed Feb. 12, 2009, which claims priority to French Application No. 08/00839, filed Feb. 15, 2008, the disclosures of each of which are expressly incorporated by reference in their entireties.

FIELD OF THE PRESENT INVENTION

The invention concerns the self-repair of organic materials, in particular polymeric materials, or inorganic, or composite materials, when in the course of their utilisation the materials in question sustain deteriorations linked to their environment and manifesting themselves by the appearance of cracks, splits, fissures, crevasses or other damage which must be filled in as quickly as possible to prevent the spread of such deteriorations, taking into account the fact that every environment in which said materials are utilised is, by definition, aggressive, as it contains all components apt to cause, for example, oxidation, damage by light, heat, or shock, erosion at the origins of more severe physicochemical, chemical, biochemical and biological deteriorations.

The invention concerns more particularly the self-repair of the deteriorations of organic materials, in particular polymers, inorganic materials and composite materials during their normal use, the self-repair of said materials making use of:
- a selected micro-encapsulated polymerisable composition comprising at least one selected polymerisable compound and where microcapsules containing the composition are incorporated in said materials to undergo self-repair, or are deposited on the outside surfaces of said materials
- and a natural agent initiating the polymerisation of the polymerisable composition in the absence of a polymerisation catalyst, when said natural agent is present in the environment in which said materials are used and in contact with said composition on its release from the microcapsules.

The invention also concerns self-repairing organic, inorganic, or composite materials, into which, or onto whose outside surfaces, the microcapsules of the selected polymerisable composition are introduced.

The invention also concerns the processes of self-repair of organic materials, in particular deteriorated polymeric, inorganic materials and composite materials, by the incorporation into whose mass, or by the deposition onto whose outside surfaces, the selected polymerisable composition microcapsules are introduced.

Lastly, the invention concerns the application of the self-repairing composition to the restoration of deteriorated organic, inorganic materials and composite materials as said deterioration occurs, by the use of selected, micro-encapsulated, polymerisable compositions for the automatic filling up of cracks, splits, crevasses, fissures, or other damage and whose polymerisation takes place automatically under the action of an initiating agent present in the environment and in the absence of any normally used polymerising catalyst.

State of the Art

It has been known for a long time that all materials, whether of organic, inorganic or composite origin such as polymeric or inorganic materials or composite materials, namely materials combining the first two types of material, are subject to degradation over time, that is to say, they age. This is why during their lifecycle these materials undergo, in particular within their environment of service, different stresses and attacks of a physical, mechanical, physicochemical, chemical, biochemical or biological nature, bringing about deteriorations inside said materials, but in particular on their surfaces. The most frequently observed deteriorations comprise splits, cracks, fissures, crevasses and other forms of damage, for example damage attributable to repeated cycles of physical stress, but also to ageing of the materials due to oxidation, heat, light, shock, erosion and other factors.

These different deteriorations may bring about mechanical embrittlement of the attacked materials, which may in turn trigger, for example in equipment made from these materials, its dysfunction, but most importantly, an arrest of its functioning and a sudden end of its lifecycle due to premature ageing.

This is why all these deteriorations must be dealt with as they occur, in order to prevent their intensification and so to increase the lifecycle of the materials in question.

For example, in the case of the appearance of cracks, splits, crevasses, fissures, voids due to shock or to other causes it is necessary rapidly to fill up the resulting voids where possible by the use of a suitable filling material possessing not only the ability to fill, but also to adhere to said materials and if possible to restore the original condition of the surface. Nevertheless, the conditions of service of the materials in question during their lifecycle may be particularly severe, rendering any curative treatment of the deteriorations in question particularly difficult.

Specific fields such as for example space exploration, as well as certain devices such as satellites, space shuttles or the like, call for protective cladding to be enabled to function correctly in their service environment. Damage of such cladding may lead to embrittlement of the apparatus and to its subsequent destruction: recall the 2003 catastrophe of the space shuttle Columbia. Satellites orbiting the earth and space shuttles re-entering the Earth's atmosphere must in fact be protected from the consequences of the shock of meeting objects, debris, meteorites present in space, or of thermal shock. These different objects colliding, for example, with a satellite, may cause impacts responsible for micro-fractures, fissures, cracks or other damage, which may spread and produce first embrittlement and then dysfunction of the device in question. The best currently available means of dealing with breakdown due to shock consists in sending a space shuttle to carry out repairs, or to recover the satellite. These operations of dealing with breakdowns involve enormous costs and a temporary cessation of the functioning of said satellite.

A solution making possible the self-repair of deteriorations of materials due to micro-cracks or micro-fractures, has been the subject of the work of researchers and industry particularly during the past decade.

In a series of documents (U.S. Pat. No. 6,858,659, U.S. Pat. No. 6,518,330 and Nature, 409, 795-797, 2001), S. R. White et al describe that they have already encapsulated an agent of self-repair, namely dicyclopentadiene, in a first type of urea-formaldehyde micro-encapsulation. Said first type of micro-encapsulation containing said agent as well as another type of micro-encapsulation containing a Grubb polymerisation catalyst, bis(tricyclohexylphosphine) benzylidene ruthenium (IV) dichloride, was included in a polymer matrix consisting of epoxy resins. On the application of mechanical stress, said authors observed a break of both types of micro-encapsulation followed by release and polymerisation of the agent of self-repair.

Problems of catalyst stability nevertheless persist.

Another document (US 2004/0007784) describes the self-repair of materials due to the incorporation therein of microcapsules containing a fluid monomer, namely norbornene (bicyclo[2,2,1]heptapentadiene or triethoxysilylnorbornene, or an oligomer such as dicyclopentadiene oligomer, which polymerises on contact with a polymerisation agent such as ruthenium or indium introduced onto the surface of a monomer or an oligomer encapsulation, rendering said agent unavailable for polymerisation purposes.

Another document (U.S. Pat. No. 7,192,993) describes a process of self-repair using a corrosive paint containing encapsulations of a liquid polymer polybutene dissolved in a solvent, phenols and an anti-corrosion agent, this process being based on the release of the contents of encapsulations to fill the zone to be repaired.

However, this process of auto-repair on the one hand releases into the environment the solvents in which the polymer is dissolved when the solution of said polymer is released from the encapsulations, and on the other hand, this process introduces a polymer of a precise composition, the choice of which may be incompatible with the composition of the material to become self-restored, the quality of the adhesion of the polymer in this case not always being ensured.

In another document (US 2001/0050032, C. Dry), provision is made for producing a matrix reinforced by self-repairing fibres filled with polymerisable monomers such as methyl methacrylate or styrene and it is explained that the self-repairing fibres present potentially introduce more mechanical losses into the matrix than encapsulations containing said monomers.

An article by I. Bond (Composites Science and Technology 2005, Vol 65 no 11-12 pp 1791-1799) describes a process of self-repair using a layer of an epoxy polymer deposited on a substrate containing a three-dimensional network of micro-channels, said micro-channels being able to occasion certain mechanical brittleness of said substrate potentially involving losses of mechanical properties potentially greater than those encountered on the incorporation of microcapsules into said substrate.

The methods described in the quoted documents nevertheless call for a catalyst whose lack of stability was previously stressed and which often is a substance which is dangerous to handle and which is harmful to the environment.

In fact, the catalyst is either encapsulated in a first type of encapsulation, or dispersed directly in a polymeric matrix, its function being that of making possible the polymerisation of the self-repair agent contained in a second type of micro-encapsulation dispersed in the material. It appears necessary for the break of the microcapsules containing the polymerisable self-repair agent to take place either simultaneously with the break of the microcapsules containing the catalyst if the latter is likewise encapsulated, or for only microcapsules containing the polymerisable self-repair agent, to be dispersed in the material in such a way as to enable the self-repair agent to migrate to meet the catalyst, if the latter is dispersed directly in the polymer matrix. In either case the two events appear to be haphazard, without affording a certainty of an encounter and consequently of success.

An article by Z. O. Oyman et al (Progress in Organic Coatings, 54, 198-204, 2005) describes a study of the oxidation of drying oils containing non-conjugated bonds (linseed oil) or conjugated bonds (tung oil) in the presence of a catalyst, namely Co(II)-2-ethylhexanoate. It appears from said document that, in the presence of oxygen, drying oils form a hard protective polymer film.

An article by J. Comyn (International Journal of Adhesion and Adhesives 18, 247-253, 1998) describes a study of polymerisation in the presence of relative humidity, of substances used as adhesives and coatings, such as cyanoacrylates, silicones and isocyanates, which are known to react in the presence of moisture to form protective polymer films.

Another document (U.S. Pat. No. 6,797,107) describes a solid, non-encapsulated cyanoacrylate composition able to liquefy at temperatures slightly higher than ambient and to polymerase following liquefaction.

Another document (US 2005/0250878) describes a composite self-repairing material into which are introduced:

polymerisable substances such as (meth)acrylates, styrene and ethylene, encapsulated in a first type of encapsulation and a polymerisation activator which is a catalyst, a hardener such as a diol or a diamine, an epoxy resin, or an initiator such as a peroxide, said polymerisation activator being encapsulated in a second type of encapsulation, and therefore completed isolated from polymerisable substances.

However according to said document it appears that the polymerisation of polymerisable substances cannot be effected without the simultaneous release of components contained in both types of encapsulation and the certainty of their coming into contact, this being an haphazard event and all the more so, since the distribution of each type of encapsulation in the composite material may be heterogeneous in terms of density and too inadequate in terms of concentration to ensure the repair of the deteriorations as they occur.

Another document (US 2007/0029653) also describes a self-repairing material formed from:

polymerisable substances such as epoxy resins, isocyanates, vinyl or acrylic resins, encapsulated in a first type of encapsulation or equivalent and a hardener such as a polyol, a polyamine or a diamine encapsulated in a second type of encapsulation, or equivalent.

These two types of encapsulation respectively containing the two types of reagent are placed into the self-repairing material, but the polymerisable substances cannot polymerise unless the two reagents are simultaneously released from their envelope and come into contact with one another. This event is naturally a haphazard one and the processes described in this document entail the same problems as those mentioned in the preceding document.

SUMMARY OF THE INVENTION

The problem which emerges following an examination of the state of the art and which has not yet been satisfactorily resolved, is that of bringing about with certainty of success, the self-repair of deteriorations sustained by organic materials, in particular polymeric materials and by inorganic or composite materials, the deteriorations being caused by environmental conditions of service of said materials. This self-repair must take place as deteriorations occur, in order to prevent their intensification and in order to restore said materials to a condition as close as possible to their initial one, and must be such that it protects the environment from the re-release of any raw materials which have not reacted, such as polymerisable compounds, polymerisation catalysts and the like.

Therefore the invention pursues the object of providing a self-repairing material able to be produced and used simply and economically, the self-repair of said material taking place in the absence of a catalyst by the polymerisation of polymerisable compositions incorporated in said materials, said polymerisation no longer being haphazard but, in practice, certain.

According to the invention, this object is attained by a fluid, micro-encapsulated, self-repairing polymerisable composition consisting of at least one selected compound polymerisable in the absence of a polymerisation catalyst, whose polymerisation takes place spontaneously in the presence of an initiating agent outside the material to be self-repaired, naturally present and permanently in the environment in which said material provides service.

The polymerisable self-repairing composition according to the invention for the repair of deteriorations sustained by organic materials and in particular by polymers, inorganic or composite materials during service, by filling up deteriorations such as cracks fissures, splits, crevasses and the like due to more or less aggressive factors present in the environment in which they serve, such as the phenomena of deteriorations due to oxidation, heat, light, shock and other causes, said polymerisable composition being encapsulated in breakable microcapsules, is characterised in that:

(i) the micro-encapsulated polymerisable composition only is incorporated into the mass of, or coated onto the outside surface of, the material intended to become self-repairing, (ii) once released from the microcapsules, said composition polymerises spontaneously without a catalyst, in the presence of a polymerisation-initiating agent outside the material intended to become self-repairing, but naturally present in the environment of its service.

The invention also concerns
  organic materials and in particular polymeric materials, inorganic materials and composite materials in which are incorporated microcapsules of a polymerisable composition consisting of at least one polymerisable compound in the absence of a previously selected catalyst,
  processes of self-repair of said materials which sustained deteriorations, in which are incorporated microcapsules containing the polymerisable composition, in the absence of a catalyser, consisting of at least one selected polymerisable compound,
  new applications concerning self-repairing compositions, self-repairing materials and the processes of self-repair according to the invention.

DETAILED DESCRIPTION OF THE INVENTION

In contrast with the state of the art which incorporates simultaneously in materials subject to deteriorations and intended to become self-repairing when they have deteriorated, a micro-encapsulated polymerisable compound encapsulated in a first type of encapsulation, and a polymerisation catalyst or a hardener protected from any contact with the polymerisable compound by being encapsulated in another type of encapsulation prior to being released, the object of the invention associates according to a novel combination:
  a spontaneously polymerisable micro-encapsulated composition consisting of at least one selected polymerisable compound, said micro-encapsulated composition being incorporated alone, in the absence of a catalyst, into materials prone to deterioration and intended to become self-repairing and
  a spontaneous polymerisation-initiating agent, in the absence of a catalyst, which is external to the deteriorated materials intended to become self-repairing, but naturally present in the environment of service of said materials.

The spontaneous polymerisation-initiating agent according to the invention, in the absence of a catalyst, of a micro-encapsulated polymerisable composition incorporated alone in materials intended to become self-repairing, consisting of at least one selected polymerisable compound, is chosen from a group constituted of ultraviolet radiation, ambient relative humidity and oxygen present in the environment of service of said materials, as the microcapsules are gradually released.

The choice of such a spontaneous polymerisation-initiating agent of a selected polymerisation composition entering the composition according to the invention and as such, in the absence of any catalyst, is governed in the context of the invention by the fact that, in contrast to the state of the art, the polymerisation-initiating agent:
  is always and instantly available for polymerisation, because it is naturally present in the environment as the release of the micro-encapsulated polymerisable composition incorporated in the materials intended to become self-repairing by the breaking of said microcapsules,
  in practice renders the polymerisation capacity of the polymerisable composition virtually certain and complete, because, in contrast with the state of the art, said agent only requires the release of the polymerisable composition incorporated in the materials intended to become self-repairing, in order to polymerise,
  cannot re-release into the environment which is accordingly protected, neither a catalyst, a hardener or the polymerisable compound as said composition polymerises spontaneously in the presence of the polymerisation-initiating agent naturally present in the environment and immediately available on site, it being understood that polymerisation, according to the invention, takes place in the absence of any catalyst in the environment, if such a catalyst were used and that the polymerisable composition when released from the microcapsules, instantly polymerises since the polymerisation-initiating agent is completely available.

The fluid polymerisable self-repairing composition according to the invention comprises at least one polymerisable compound, which is a monomer and/or an oligomer and/or a pre-polymer selected according to the required polymerisation-initiating agent. At least one such polymerisable compound can be used either on its own, or in a mixture if there are several, possibly associated with a radical-type or cationic polymerisation initiator according to the choice of the at least one monomer and/or oligomer and/or pre-polymer.

Depending on the agent required for initiating spontaneous polymerisation, to effect according to the invention the self-repair of organic, inorganic or composite materials sustaining deteriorations in their service environment, the polymerisable, micro-encapsulated composition integrated, alone, into said materials intended to become self-repairing by incorporation into their mass, or deposited onto their outside surfaces, consists of at least one polymerisable compound selected from among polymerisable compounds, which are monomers, or oligomers of said monomers, that is to say low molar mass polymers, or pre-polymers.

Ultraviolet Radiation Polymerisation

When, according to the invention, the required polymerisation-initiating agent is ultraviolet radiation, the polymerisable micro-encapsulated composition is made from at least one selected polymerisable compound, whose polymerisation is spontaneous in the presence of said polymerisation-initiating agent, said at least one polymerisable compound being chosen from a group constituted of monomers and/or oligomers and/or pre-polymers of the acrylic and/or methacrylic, or the epoxy, or of the vinyl ether type.

When the polymerisable composition consists of at least one polymerisable compound chosen from a group constituted of monomers and/or oligomers and/or pre-polymers of the acrylic or the methacrylic type, these compounds have the general formula (I):

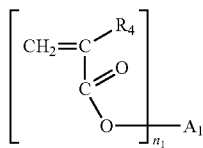

where
$R_4$ is hydrogen or a methyl
$A_1$ is an organic radical
$n_1$ is a whole number from 1 to 6 inclusive.

All these compounds can be used either on their own or in a mixture.

It is particularly possible to use the acrylate monomers, oligomers or pre-polymers chosen from among compounds such as: methyl-acrylate, methyl methacrylate, ethyl acrylate, isopropyl methacrylate, n-hexyl acrylate, stearyl acrylate, allyl acrylate, phenoxyethyl acrylate, trimethylolpropaneformal acrylate, lauryl acrylate, dihydrodicyclopentadienyl acrylate, 4-t-butylethylene glycol diacrylate, diethylene glycol diacrylate, triethylene glycol dimethacrylate, dipropylene glycol diacrylate, tripropylene glycol diacrylate, butanediol diacrylate, hexanediol diacrylate, 1,3-propanediol diacrylate, glycerol triacrylate, trimethylol propane triacrylate, ethoyxylated trimethylolpropane triacrylate, 1,3-propanediol dimethacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, bis[1-(3-acryloxy-2-hydroxy)]-p-propoxyphenylmethane, from bis-acrylate and bis-methacrylate of polyethylene glycol of molar mass 200-500, polymerisable mixtures of the aforementioned monomers and acrylate oligomers such as amine-modified polyether acrylates, polyurethane acrylate, polyester acrylate, polyether acrylate, amine-modified multifunctional acrylate, fatty acid-modified polyester hexaacrylate, polyester tetraacrylate, acid-functional polyester methacrylate, hexafunctional polyester acrylate, fatty acid-modified hexafunctional polyester acrylate, aliphatic urethane diacrylate, aliphatic urethane triacrylate, aliphatic hexafunctional urethane acrylate, silicone acrylate.

These polymerisable compounds of the acrylate or methacrylate type of formula (I) require polymerisation by radical-based photo-polymerisation and require consequently the presence of a radical-based photo-initiator in the polymerisable composition.

The radical-based photo-initiator participating in the framework of the invention for the radical-based polymerisation of the polymerisable composition is associated in a mixture with said composition, the mixture being micro-encapsulated and forming the self-repairing polymerisable composition according to the invention.

The radical-based photo-initiator for the radical-based photo-polymerisation of the polymerisable composition having general formula (I) is chosen from the group constituted of organic compounds containing at least one phenol ring substituted with a carbonyl group or a nitrogen or sulphur-bearing group, and more particularly organic compounds containing within their molecules chemical bonds capable to be homolytically broken by ultraviolet radiation and at least one phenol ring substituted with a carbonyl group or a phosphorous, nitrogen or sulphur-bearing group.

The radical-based photo-initiators that can be particularly mentioned are chosen among compounds such as: 1-hydroxycyclohexyl-phenyl ketone, benzophenone, 2-hydroxy-2-methyl-1-phenyl-1-propanone, methylbenzoylformate, α,α-dimethoxy-α-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, phenyl bis(2,4,6-trimethylbenzoyl)-phosphine oxide, phosphine oxide, phenyl bis(2,4,6-trimethylbenzoyl), bis (eta 5-2,4 cyclopentadiene-1-yl)bis[2,6-difluoro-3-(1H-pyrrol-1-yl)phenyl]titanium.

All the aforementioned compounds are distributed under the following registered marks, namely, Irgacure® 184, 500, 1000, 2959, 651, 369, 907, 1300, 819, 819DW, 2005, 2010, 2020, 784, Darocur® 1173, MBF, TPO and 4265, by Ciba Specialty Chemicals Inc.

When the composition that is polymerisable by photo-polymerisation consists of at least one polymerisable compound chosen from the group consisting of monomers and/or oligomers and/or pre-polymers of the mono-, di- or tri functional epoxy type, these compounds have the general formula (II):

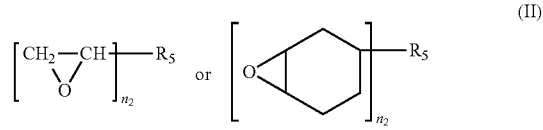

where $n_2$ is a whole number between 1 and 3 and
$R_5$ is an organic radical.

All these compounds can be used either on their own or in a mixture.

The epoxides that can be particularly mentioned are chosen from the following compounds: 3,4-epoxycyclohexylmethyl-3,4-epoxycyclohexane carboxylate, marketed under the trademark Cyracure UVR 6105 and 6110 by Union Carbide Corp and Uvacure 1500 from UCB Chemicals, 3,4-epoxy-6-methylcyclohexylmethyl-3,4-epoxy-6-methylcyclohexene carboxylate marketed under the trademark ERL-4221, bis(3,4-epoxy-6-methylcyclohexylmethyl) adipate marketed under the trademark Cyracure® UVR 6128 by Union Carbide Corp., octadecylene oxide, epichlorohydrin, styrene oxide, vinylcyclohexene oxide, glycidol, glycidyl methacrylate, bisphenol A diglycidyl ether marketed under the trademark EPON® 828, 825, 1004 and 1010 by Shell Chemical Co, vinylcyclohexene dioxide marketed under the trademark ERL-4206 by Union Carbide Corp., bis(2,3-epoxycyclopentyl ether) marketed under the trademark ERL-0400 by Union Carbide Corp, epoxy-modified polypropylene glycol (ERL-4050 and ERL-4052 by Union Carbide Corp.), dipentene dioxide (ERL-4269), polybutadiene epoxide (Oxtron 2001 by FMC Corp.), epoxy-containing siliconised resin, fire-resistant epoxy resin (Dow Chemical Co.), 1,4-butanediol diglycidyl phenolformaldehyde ether Novolac (DEN-431 and DEN 4338 by Dow Chemical Co), vinylcyclohexene monoxide 1,2-epoxyhexadecane (UVR-6216 by Union Carbide Corp.), alkyl (C8-C12) glycidyl ethers (HELOXY Modifier 7 and 8, Shell Chemical Co.), 1,4-butanediol diglycidyl ether, neopentyl glycol diglycidyl ether (HELOXY Modifier 68), cyclohexane dimethanol diglycidyl ether, trimethylol ethane triglycidyl ether, trimethylol propane triglycidyl ether, aliphatic polyol polyglycidyl ether, polyglycol diepoxide (HELOXY Modifier 67, 68, 107, 44, 48, 84 and respectively 32 by Shell Chemical Co.), bisphenol F diepoxides (EPN-1138 and GY-281 from Ciba-Geigy Corp) and glycidyl acrylates and methacrylates.

When the composition that is polymerisable by photopolymerisation consists of at least one compound chosen from the group constituted of monomers and/or oligomers and/or pre-polymers of the vinyl ether type, these compounds have the following general formula (III):

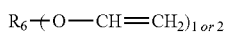  (III)

where $R_6$ is an organic derivative.

All these compounds can be used either on their own or in a mixture.

Vinyl ethers that may be mentioned in particular, are chosen from among the following compounds: cyclohexanedimethanol divinylether, diethylaminoethylvinylether, tetraethyleneglycol divinylether, triethyleneglycol divinylether, cyclohexane dimethanol vinylether, cyclohexyl vinylether, n-dodecyl vinylether, lauryl vinylether, triethyleneglycol divinylether, 4-hydroxybutylvinylether.

Polymerisable compounds of the epoxide type of formula II, or of the vinyl ether type of formula III, require cationic photo-polymerisation mechanisms and consequently the presence of cationic photo-initiators.

The cationic photo-initiators participating in the framework of the invention for the cationic photo-polymerisation of the polymerisable composition is associated in a mixture with said composition, the mixture obtained being microencapsulated and forming the self-repairing polymerisable composition according to the invention.

The cationic photo-initiators for the photo-polymerisation of the polymerisable composition according to formula II and III, is chosen from the group constituted of ionic compounds containing organic cations such as aryl sulphonium or aryl iodonium compounds and anions such as $SF_6$—, $PF_6$—, $AsF_6$—, $BF_4$—, $PO_4$— able to attack said polymerisable composition electrophilically, creating cationic species able to pursue polymerisation.

Preferentially the cationic photo-initiator is an aryl sulphonium salt, in particular triaryl sulphonium phosphate, triarylsulphonium antimonate, triarylsulphonium hexafluorophosphate (UVI 6974, UVI 6992), or an aryl iodonium salt such as diaryliodonium hexafluoroantimonate, bisdodecylphenyliodonium hexafluoroantimonate, iodonium, (4-methylphenyl [4-(2-methylpropyl)phenyl]-hexafluorophosphate (1-) (CGI 562) marketed by Ciba® Specialty Chemicals or by Union Carbide Corp).

The concentrations of the polymerisable compounds in the polymerisable self-repairing composition expressed in % by weight are 1) 90 to 99%, preferably 95-99% of said polymerisable compounds,
2) 1 to 10% of said photo-initiators, preferably 1 to 5%.

Polymerisation by Ambient Relative Humidity

When, according to the invention, the polymerisation-initiating agent solicited is ambient relative humidity, the microencapsulated composition is formed from at least one selected polymerisable compound, whose polymerisation is spontaneous in the presence of said polymerisation-initiating agent and chosen from the group constituted of monomers and/or oligomers and/or pre-polymers of the type:

mono- or plurifunctional cyanoacrylate of formula IV:

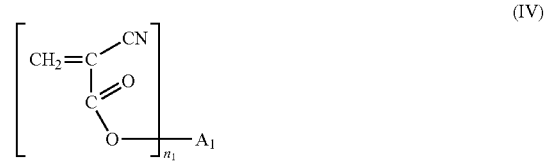  (IV)

where $A_1$ is an organic residue
$n_1$ is a whole number from 1 to 6.

All these compounds can be used either on their own or in a mixture.

or a plurifunctional isocyanate, of formula (V)

  (V)

where R is an aromatic or aliphatic organic group with isocyanate or other functions.

All these compounds can be used either on their own or in a mixture.

or a silane of formula (VI)

$$XnSi(OR)4-n \qquad (VI)$$

where
n is 0 or 1.
X is a functional group selected from its compatibility with the resin whose adhesion the silane must improve. This may be a vinyl, acryl, amino, mercapto or epoxy group.

All these compounds can be used either on their own or in a mixture.

When at least one of the selected polymerisable compounds is of the cyanoacrylate type, it is more particularly chosen from among the following compounds: methyl cyanoacrylate, diethyl 3,3'-(1,4-phenylene)bis(2-cyanoacrylate), ethyl 3-(3-chloro-4-methoxyphenyl)-2-cyanoacrylate, ethyl 2-cyanoacrylate, ethyl 3-(5-(2-chloro-5-(trifluoromethyl)phenyl)-2-cyanoacrylate, ethyl 3-(5-2-(chlorophenyl)-2-furyl)-2-cyanoacrylate, ethyl 3-(5-3-chlorophenyl)-2-furyl)-2-cyanoacrylate, ethyl 3-(5-(4-chlorophenyl)-2-furyl)-2-cyanoacrylate, 3-(5-bromo-2-furyl)-2-cyanoacrylate, 3-(5-(4-(aminosulphonyl)phenyl-2-furyl)-2-cyanoacrylate.

When at least one of the selected polymerisable compounds is of the isocyanate type, it is more particularly chosen from among the following compounds: 1,6 hexamethylene diisocyanate, methylene diphenyl diisocyanate, toluene-2,4-diisocyanate, toluene 2,6-diisocyanate, isophorone diisocyanate, napthylene-1,5 diisocyanate, paraxylylene diisocyanate, m-tetramethylxylene diisocyanate, meta-xylylene diisocyanate, dicyclohexylmethane-4,4'-diisocyanate, triphenylmethane triisocyanate, 1,6,11-undecane triisocyanate, 2,2-bis(isocyanatomethyl) propyl isocyanate, 4-(isocyanatomethyl)-1,7-heptyl diisocyanate.

When at least one of the selected polymerisable compounds is of the silane type, it is more particularly chosen from among the following compounds: aminopropyl trimethoxysilane, vinyl trimethoxysilane, methacryloxy trimethoxysilane, glycidoxypropyltrimethoxysilane, mercaptopropyl trimethoxysilane, (N-2-aminoethyl) aminopropyltrimethoxysilane, tetraethoxysilane.

Polymerisation by Atmospheric Oxygen

When according to the invention, the polymerisation-initiating agent solicited is atmospheric oxygen, the micro-encapsulated composition is formed from at least one selected polymerisable compound whose polymerisation is spontaneous in the presence of said polymerisation-initiating agent. This compound is chosen from the group constituted of drying or semi-drying oils, glyceryl esters of different linear saturated, mono- and polyunsaturated fatty acids, said glyceryl esters having the property, under the effect of oxygen in air, to react by giving a three-dimensional macromolecular structure.

Drying and semi-drying oils used in the context of the present invention are preferentially chosen from the group constituted of linseed oil, perilla seed oil, stillingia oil, walnut oil, tung oil, oiticica oil, isano oil, dehydrated castor oil, camelina seed oil, safflower seed oil, cottonseed oil, poppyseed oil, grape seed oil, soybean oil and sunflower seed oil.

All these oils can be used either on their own or in a mixture.

The fluid polymerisable composition according to the invention for the self-repair of deterioration sustained by materials in their service environment, as said deterioration occurs, is encapsulated in microcapsules the walls of which are resistant not only to the compounds of said composition, but also to ultraviolet radiation, environmental relative humidity and atmospheric oxygen.

When an ultraviolet radiation polymerisation initiator such as a radical-based or cationic photo-initiator is used, said polymerisation initiator is micro-encapsulated in the form of a mixture with the fluid polymerisable composition in the same microcapsule.

The micro-encapsulation of the polymerisable composition according to the invention, either alone or with a polymerisation initiator, is implemented using known processes, such as, for example, interfacial polycondensation, the sol-gel process, the fluidised bed process, the process using supercritical fluids, or others and using known compounds for forming the microcapsule membrane.

So long as the fluid polymerisable composition has been micro-encapsulated, it remains protected from the polymerisation-initiating agent. But as soon as at least one of the microcapsules containing the polymerisable composition has been broken by whatever action, the polymerisable self-repairing composition is released and polymerises spontaneously in the presence of said polymerisation-initiating agent naturally present in the service environment of said microcapsules.

The microcapsules containing the self-repairing polymerisable composition according to the invention, either on their own or in a mixture with a radical-based or cationic polymerisation initiator, have diametrical dimensions, that is to say similar to a diameter, between 0.1 μm and 500 μm, but preferably between 0.5 μm and 20 μm.

The invention likewise concerns organic self-repairing materials and polymers, in particular inorganic self-repairing materials, composite self-repairing materials, rendered self-repairing by the incorporation into their mass of breakable microcapsules of the fluid self-repairing polymerisable composition, or by coating their outside surfaces with said microcapsules with the self-repairing polymerisable composition according to the invention and this in the absence of a polymerisation catalyst.

According to the invention the incorporation into the materials of the breakable microcapsules containing the fluid self-repairing polymerisable composition in order to render them self-repairing, can be implemented using one of the following methods, namely
  the incorporation into the mass of said materials, of a multiplicity of microcapsules containing said fluid polymerisable composition at the moment of the formation of the mass of said materials and/or
  the coating of the outside surface of said materials with a film containing the microcapsules of the fluid polymerisable composition such as, for example, a sol-gel containing said microcapsules.

Thus, organic materials, in particular polymers, inorganic materials and composite materials sustaining deteriorations in their service environment, are rendered self-repairing by the polymerisable micro-encapsulated self-repairing composition according to the present invention, incorporated in said materials, as the polymerisation of said composition occurs spontaneously in the absence of a catalyst, given that when released from the microcapsules, it is in the presence of the appropriate initiating agent, which is naturally present in the service environment.

The choice of the polymerisable self-repairing micro-encapsulated composition to be incorporated into materials to be rendered self-repairing according to the invention, is made on the basis of the ability of said composition, chosen and formulated from compounds selected from the group of compounds described previously, to possess, on the one hand an affinity with the composition of each material to be rendered self-repairing and on the other hand, dependent on the polymerisation-initiating agent to be selected from three possible ones in the environment of said material, namely, ultraviolet radiation, relative humidity and oxygen. Therefore, a single type of a polymerisable self-repairing micro-encapsulated composition reacting with one of the three polymerisation-initiating agents, is incorporated into a material to be rendered self-repairing. But according to the invention it is also possible to incorporate simultaneously and separately into the material to be rendered self-repairing, up to three types of polymerisable, self-repairing micro-encapsulated compositions, each type of composition, indeed the three types of composition polymerising spontaneously in the presence of the appropriate initiating agent, namely, ultraviolet radiation, relative humidity and oxygen.

Therefore and according to the invention, a process of self-repair of materials becomes remarkable through the fact of the incorporation into an organic, inorganic or composite material, of microcapsules containing all of at least one polymerisable, self-repairing composition formed by at least one fluid polymerisable compound and possibly a polymerisation initiator mixed with the composition in the same capsules, said composition being adapted to said material and its polymerisation occurring spontaneously in the presence of the initiating agent naturally present in the environment, in such a way that as soon as deteriorations appear in the material, for example a crack formed, the result is the rupture of microcapsules located where said deterioration are and the release of the fluid self-repairing composition, which then fills said deterioration by capillarity and polymerises there and fills it in in the absence of a catalyst.

Thus, the process of self-repair of an organic or inorganic material, in particular of a polymeric material, is characterised in that there is incorporated into said material a plurality of breakable microcapsules containing at least one polymerisable self-repairing composition consisting of at least one liquid or fluid polymerisable self-repairing compound whose polymerisation occurs spontaneously in the presence of its polymerisation-initiating agent present in the environment, such as ultraviolet radiation, ambient humidity or oxygen, in the absence of a catalyst, so that for example the formation of a crack in the material results in the rupture of the microcapsules located where the crack is and in the release of the fluid self-repairing compound, which then fills the crack by capillarity, polymerisation occurring spontaneously by the action of said polymerisation-initiating agent naturally present in the environment, namely, ultraviolet radiation, ambient humidity and oxygen.

The present invention can be applied to the production of organic, inorganic or composite self-repairing materials destined for the production of different objects and devices belonging to different areas of activity, such as for example aerospace, terrestrial transport vehicles, naval constructions, bodywork and parts of machines to be used for professional or household purposes, electrical components and others.

The inventions will be better understood from the illustrative, but non-limitative examples below.

Example 1

Encapsulation of an Acrylic Monomer, Trimethylol Propane Triacrylate (TMPTA) Using the Sol-Gel Process the wall of the microcapsules was prepared in a precursor micro-emulsion system consisting of a monomer in water (O/W emulsion) in an alkaline environment ($NH_4OH$ 16%) using a hydrolysis-condensation reaction between the precursors tetraethylorthosilicate (TEOS) and 3-(trimethoxysilyl)propylmethacrylate (MPTS) in ethanol at room temperature for 2 hours.

The self-repairing polymerisable composition to be microencapsulated, is formed from monomeric trimethylolpropane triacrylate (TMPTA) and a photo-initiator (DAROCUR 1173) in a mixture.

Method Used in this Example

The compounds able to form the microcapsule wall are successively placed in a round-bottomed flask: 1 g of MPTS, 1 g of TEOS, then 1 g of TMPTA, 0.05 g of the photo-initiator Darocur 1173 constituting the self-repair agent and 4 g of ethanol. The solution is magnetically agitated (500-1000 rpm). Then, drop by drop, 1.75 ml of an ammonia aqueous solution (16% in weight), then log of 1% in weight surfactant aqueous solution (Igepal) at 1% in weight are added. The solution turns white and the formation of particles is noted. The mixture is agitated for several hours at room temperature. It is then vacuum-filtered to collect the particles which are then washed in an ethanol/water mixture (50/50). The particles are then dried.

The morphology of the particles was studied by scanning electron microscopy. The microcapsules obtained had diameters in the range of 1 to 20 μm and were spherical in shape.

Under the effect of a shock said microcapsules rupture, empty and the released monomer flows into a crack where it polymerises spontaneously under the effect of ultraviolet radiation (200-450 nm, 120 W/cm), or under exposure to sunlight, yielding a polymer which was characterised.

The microcapsules will be incorporated into a material to render it self-repairing.

Example 2

Encapsulation of an Acrylic Monomer, Trimethylol Propane Triacrylate (TMPTA) by Interface Condensation the wall of the microcapsules is formed from hexamethylene diisocyanate (HMDI) and ethylene diamine,
the self-repairing polymerisable composition to be microencapsulated is formed from the monomer trimethylol propane triacrylate (TMPTA) and a photo-initiator (DAROCUR 1173) in a mixture.

Method Used in this Example 100 ml of water and 3 g of polyvinyl alcohol (a surfactant) are placed in a round-bottomed flask and the solution is magnetically agitated at 300 rpm.

Then 5 g of the monomer TMPTA and 0.05 g of photo-initiator (Darocur 1173) are added, this mixture constituting the self-repairing polymerisable composition, and 2 g of hexamethylene diisocyanate (HMDI) or monomer 1 participating in the formation of the microcapsules. An oil-in-water emulsion forms under agitation. Then 2 g of ethylene diamine or monomer 2 reacting with monomer 1 are added and the mixture is maintained at room temperature for several hours, until its pH has stabilised. Monomer 1 and monomer 2 react at the interface to form the polyurea wall of the capsules filled with the self-repairing polymerisable composition. The microcapsules are the filtered then washed in an ethanol-water (50/50) solution. The polyurea microcapsules filled with the monomer TMPTA and the photo-initiator are dried.

Under the effect of a shock, the microcapsules rupture and the monomer TMPTA is released, fills a crack and polymerises spontaneously under the effect of ultraviolet radiation (exposure to sunlight), thanks to the presence of the photo-initiator (Darocur 1173), filling in the crack.

The microcapsules will be incorporated in a material to render it self-repairing.

Example 3

Encapsulation of 1,6 Hexamethylene Diisocyanate (HMDI) using a Sol-Gel Process Microcapsules of silica were prepared in a monomer-in-water precursor micro-emulsion system in an acid medium (HCl 1M).
the wall of the microcapsules is formed by the reaction between the precursors TEOS and MPTS (see Example 1).
the self-repairing polymerisable composition to be microencapsulated is formed from the monomer 1,6 hexamethylene diisocyanate (HMDI).

Method Used in this Example

The membrane of the microcapsules consisting of silica was obtained by the hydrolysis-condensation reaction between the precursors (TEOS and MPTS) at room temperature for 1 hour. 0.75 g of 1,6 hexamethylene diisocyanate (HMDI: monomer) was mixed with the silica precursors (1 g of TEOS and 1 g of MPTS) and 1 ml of aqueous hydrochloric acid was then added drop by drop to the mixture (pH=2). The mixture was agitated at room temperature for approximately 10 minutes. The mixture was then homogenised to form an oil-in-water (O/W) emulsion in 10 ml of a solution of Igepal (NP12) (1%). The emulsifying solution was then agitated at room temperature for approximately 1 hour using a magnetic stirrer.

Under the effect of a shock or for some other reason causing the rupture of the microcapsules, the polymerisable monomer HMDI is released and polymerises in the presence of the ambient air humidity, filling the crack into which it has flowed.

The microcapsules will be incorporated into a material to render it self-repairing.

Example 4

Encapsulation of 1,6 Hexamethylene Diisocyanate (HMDI) by Interfacial Polycondensation the wall of the microcapsules is formed by reaction between 1,6 hexamethylene diisocyanate (HMDI) (monomer 1) and a mixture of secondary and tertiary amines (monomer 2), the self-repairing polymerisable composition to be microencapsulated is formed from 1,6 hexamethylene diisocyanate (HMDI).

Method Used in this Example 100 ml of water and 3 g of polyvinyl alcohol (surfactant 3%) are mixed in a reaction vessel. When the surfactant has dissolved, 8 g of 1,6 hexamethylene diisocyanate (HMDI) are added with mechanical agitation (500 rpm) to the aqueous phase. Excess HMDI constitutes both the self-repair agent and monomer 1 of the wall. After 10 minutes and when the emulsion has stabilized, 1 g of a mixture of 0.4 g of ethylene diamine and 0.6 g of Jeffamine T403 are incorporated into the emulsion. This mixture of secondary and tertiary amines represents the monomer 2 which by reacting with monomer 1 leads to the formation of microcapsules of polyurea filled with the self-repair agent. Then the microcapsules are filtered and washed with a water/alcohol mixture (50/50 V/V).

Under the effect of a shock or any other reason causing the microcapsules to rupture, the polymerisable monomer (HMDI) is released and polymerises in the presence of ambient air humidity, filling the crack into which it has flowed.

The microcapsules will be incorporated into a material to render it self-repairing.

Example 5

Encapsulation of a Silane Compound (Tetraethoxysilane) by Interface Polycondensation the wall of the microcapsules is formed by the reaction of 2,4-tolylenediisocyanate (TDI) (monomer 1) and 1,3 phenylenediamine (monomer 2).

the self-repairing polymerisable composition to be microencapsulated is formed from the monomer tetraethoxysilane.

Silane compounds hydrolyse to form silanols and can then be condensed with one another to form siloxane compounds (silicones). This chemical reaction between the silane compound and water is exploited to make self-repair possible by the release of an encapsulated silane exposed to humidity. The silicone forms a self-repairing film.

Method Used in this Example

Using mechanical agitation (500 rpm), 3 g of surfactant (polyvinyl alcohol) and 100 ml of demineralised water are placed in a 100 ml reaction vessel (dispersing medium). Following dissolution, a mixture consisting of 8 g of tetraethoxysilane (self-repair agent) and 1 g of 2,4-tolylenediisocyanate (monomer 1) is added. Following the stabilisation of the emulsion (approximately 10 minutes), 1 g of 1,3 phenylene diamine (monomer 2) is added to the emulsion. The reaction is then continued for approximately 30 minutes. The microcapsules are then filtered, washed and dried.

Under the impact of a shock or for another reason causing the microcapsules to rupture, the polymerisable monomer (tetraethoxysilane) is released, hydrolyses on contact with atmospheric humidity, condenses and forms siloxane bonds producing a silicone film which seals a crack.

The microcapsules will be incorporated into a material to render it self-repairing.

Example 6

Encapsulation of a Drying Resin (Linseed Oil) Using a Sol-Gel Process the wall of the microcapsules is formed from MPTS and TEOS (see Example 1 for definition).

the self-repairing polymerisable composition to be microencapsulated is formed by linseed oil.

Method Used in this Example

The reagents able to form the wall of the microcapsules are successively placed in a round-bottomed flask, such as 1 g of MPTS, 1 g of TEOS then 0.75 g of linseed oil constituting the self-repairing agent, and 4 g of ethanol. The solution is magnetically agitated (500-1000 rpm). Then drop by drop 1.75 ml of an ammonia aqueous solution (16% in weight), then 10 g of a surfactant aqueous solution (Igepal) at 1% in weight are added. The solution turns white and the formation of particles is noted. The mixture is agitated at room temperature for 2 hours. It is then vacuum-filtered to collect the particles which are then washed in an ethanol/water mixture (50/50) then dried.

Under the effect of a shock or some other reason causing the rupture of the microcapsules, the linseed oil is released, flows into a crack and by reaction with atmospheric oxygen forms a sealing film.

The microcapsules will be incorporated in a material to render it self-repairing.

Example 7

Encapsulation of a Drying Resin (Linseed Oil) by Interface Poly-Condensation the wall of the microcapsules is formed from 2,4-toluene diisocyanate (monomer 1) and 1,3-phenylene diamine, (monomer 2).

the self-repairing, polymerisable composition is linseed oil.

Method Used in this Example 100 ml of water and 3 g of polyvinyl alcohol (surfactant 3%) are mixed in a 100 ml reaction vessel. After the surfactant has dissolved, a mixture consisting of 1 g of 2,4-toluene diisocyanate (monomer 1), 15 g of a drying resin such as linseed oil and 0.45 g of drying agent constituting the self-repair agent are added, with mechanical agitation (500 rpm) under an atmosphere of nitrogen to the aqueous phase. At the end of 10 minutes, after the emulsion has stabilised, 1 g of 1,3-phenylene diamine (monomer 2) dissolved in 10 ml of water is added to the emulsion, resulting in the formation of microcapsules of polyurea by condensation between monomer 1 and monomer 2.

The microcapsules are then filtered, washed with a water/alcohol mixture (50/50 V/V). After drying these capsules are incorporated into a composite material such as a polyamide, a polysiloxane . . . .

Under the effect of a shock causing the rupture of the microcapsules, the linseed oil is released, flows into a crack and forms a sealing film by reaction with atmospheric oxygen.

The microcapsules will be incorporated into a material to render itself-repairing.

The invention claimed is:

1. A self-repairing material comprising within its mass or on its surface a plurality of breakable microcapsules containing a self-repairing composition constituted of at least one fluid polymerisable compound, and a radical-based photo-initiator mixed with said composition, wherein the polymerisation of the at least one fluid polymerisable compound occurs spontaneously in the presence of a polymerisation-initiating agent, outside the material intended to become self-repairing, said polymerisation-initiating agent being naturally present in the service environment of said material, and wherein said material comprises no catalyst for said polymerisation, and wherein the polymerisation-initiating agent is selected from the group consisting of ultraviolet radiation, ambient air humidity and atmospheric oxygen, wherein when the polymerisation-initiating agent is ultraviolet radiation, the polymerisable compound is monomers, oligomers, or prepolymers of acrylic and/or methacrylic, mono-, di-, or tri-functional epoxy, or vinyl ether compounds; when the polymerisation-initiating agent is ambient air humidity, the polymerisable compound is monomers, oligomers, or prepolymers of plurifunctional cyanoacrylate, isocyanate, or silane compounds; when the polymerisation-initiating agent is atmospheric oxygen, the polymerisable compound is drying or semi drying oils composed of saturated mono- and polyunsaturated linear fatty acid glyceryl esters, and wherein the composition comprises 90-99% of the polymerisable compounds and 1-10% by weight of the photo-initiators.

2. The self-repairing material according to claim 1, characterised in that the microcapsules incorporated into said material contain a self-repairing polymerisable composition to self-repair deteriorations in the service environment of said material, wherein said at least one fluid polymerisable compound is a monomer and/or an oligomer and/or a pre-polymer.

3. The self-repairing material according to at least one of claim 1 or 2, characterised in that in a case where the polymerisation-initiating agent naturally present in the environment is ultraviolet radiation, the polymerisable compound is selected from the group consisting of monomers, oligomers, and pre-polymers of formula (I):

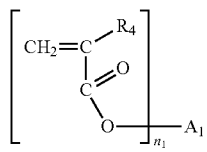

where
R$_4$ is hydrogen or a methyl
A$_1$ is an organic residue
n$_1$ is a whole number from 1 to 6 inclusive.

4. The self-repairing material according to claim 3, characterised in that at least one polymerisable compound is selected from the group consisting of methylacrylate, methylmethacrylate, ethylacrylate, isopropylmethacrylate, n-hexylacrylate, stearylacrylate, allylacrylate, phenoxyethyl acrylate, trimethylolpropaneformal acrylate, lauryl acrylate, dihydrodicyclopentadienyl acrylate, 4-t-butylethylene glycol diacrylate, diethylene glycol diacrylate, triethylene glycol dimethacrylate, dipropylene glycol diacrylate, tripropylene glycol diacrylate, butanediol diacrylate, hexanediol diacrylate, 1,3-propanediol diacrylate, glycerol triacrylate, trimethylol propane triacrylate, ethoxylated trimethylolpropane triacrylate, 1,3-propanediol dimethacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate bis[1-(2-acryloxy]-p-ethoxyphenyldimethylmethane,bis[1-(3-acryloxy-2-hydroxy)]-p-propoxyphenyl methane, polytheylene glycol bis acrylate and bis methacrylate of molecular mass 200-500, polymerisable mixtures of the aforementioned monomers and of acrylate oligomers chosen from the group consisting of: amine-modified polyether acrylates, polyurethane acrylate, polyester acrylate, polyether acrylate, amine-modified multifunctional acrylate, fatty acid-modified polyester hexaacrylate, polyester tetraacrylate, acid-functionalised polyester methacrylate, hexafunctional polyester acrylate, fatty acid-modified hexafunctional polyester acrylate, aliphatic urethane diacrylate, aliphatic urethane triacrylate, hexafunctional aliphatic urethane acrylate and silicone acrylate.

5. The self-repairing material according to at least one of claim 1 or 2, characterised in that when the polymerisable compound is acrylic and/or methacrylic, the radical-based photo-initiator is associated in a mixture with said composition prior to micro-encapsulation, the mixture formed being micro-encapsulated.

6. The self-repairing material according to claim 5, characterised in that the radical-based photo-initiator is selected from the group consisting of: 1-hydroxy-cyclohexyl-phenol-ketone, benzophenone, 2-hydroxy-2-methyl-1-phenyl-1-propanone, methylbenzoylformate, α,α-dimethoxy-α-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, phosphine oxide, phenyl bis(2,4,6-trimethyl benzoyl)-phosphine oxide, and bis(eta 5,2,4-cyclopentadiene-1-yl)bis[2,6-difluoro-3-(1H-pyrrol-1-yl)phenyl]titanium.

7. The self-repairing material according to at least one of claim 1 or 2, characterised in that in a case where the polymerisation-initiating agent naturally present in the environment is ultraviolet radiation, the polymerisable component is selected from the group consisting of monomers, oligomer, and pre-polymers of general formula (II):

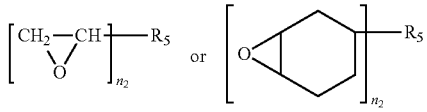

where n$_2$ is a whole number 1 to 3 and
R$_5$ is an organic radical residue.

8. The self-repairing material according to claim 7, characterised in that the epoxy compound is selected from the group consisting of: 3,4-epoxycyclohexylmethyl-3,4-epoxycyclohexane carboxylate, 3,4-epoxy-6-methylcyclohexylmethyl-3,4-epoxy-6-methylcyclohexene carboxylate, bis(3,4-epoxy-6-methylcyclohexylmethyl)adipate, octadecylene oxide, epichlorhydrin, styrene oxide, vinylcyclohexene oxide, glycidol, glycidyl methacrylate, bisphenol A diglycidyl ether, vinylcyclohexene dioxide, bis (2,3-epoxycyclopentyl ether), epoxy-modified polypropylene glycol, dipentene dioxide, polybutadiene epoxide, siliconised resin containing epoxy, epoxy resin rendered fire-resistant, 1,4-butanediol phenol-formaldehyde diglycidyl ether, vinyl-cyclohexene monoxide, 1,2-epoxy-hexadecane, alkyl ($C_8$-$C_{12}$) glycidyl ethers, 1,4-butanediol diglycidyl ether, neopentyl glycol diglycidyl ether, cyclohexane dimethanol diglycidyl ether, trimethylol ethane triglycidyl ether, trimethylol propane triglycidyl ether, aliphatic polyol polyglycidyl ether, polyglycol diepoxide, bisphenol F diepoxides and glycidyl acrylates and methacrylates.

9. The self-repairing material according to at least one of claim 1 or 2, characterised in that in the case where the polymerisation-initiating agent naturally present in the environment is ultraviolet radiation, the polymerisable compound is selected from the group consisting of monomers, and/or oligomers, and and/or pre-polymers of the vinyl ether compounds, these compounds having the following general formula (III):

where $R_6$ is an organic derivative residue.

10. The self-repairing material according to claim 9, characterised in that the at least one vinyl ether compound is selected from the group consisting of cyclohexanedimethanol divinylether, diethylaminoethylvinylether, tetraethyleneglycol divinylether, triethyleneglycol divinylether, cyclohexane dimethanol vinylether, cyclohexyl vinylether, n-dodecyl vinylether, lauryl vinylether, triethyleneglycol divinylether and 4-hydroxybutyl-vinyl-ether.

11. The self-repairing material according to claim 7, characterised in that when at least one polymerisable compound is of the epoxy or vinyl ether compound, a cationic photo-initiator is associated in a mixture with said composition prior to encapsulation, the mixture being micro-encapsulated.

12. The self-repairing material according to claim 11, characterised in that the cationic photo-initiator is selected from the group consisting of an aryl sulphonium salt, in particular triaryl sulphonium phosphate, triarylsulphonium antimonate, triarylsulphonium hexafluorophosphate or an aryl iodonium salt selected from the group constituted of diaryliodonium hexafluoroantimonate, bisdodecylphenyliodonium hexafluoroantimonate, iodonium and (4-methylphenyl)[4-(2-methylpropyl)phenyl]-hexafluorophosphate (1-).

13. The self-repairing material according to at least one of claim 1 or 2, characterised in that the concentrations of polymerisable compounds in the self-repairing polymerisable composition by ultraviolet radiation expressed in % by weight are the following:

90-99% of said polymerisable compounds, 1 to 10% of said photo-initiators.

14. The self-repairing material according to at least one of claim 1 or 2, characterised in that in the case where the polymerisation-initiating agent naturally present in the environment is ambient relative humidity, at least one selected polymerisable compound is selected from the group consisting of monomers, oligomers, and pre-polymers of formula IV:

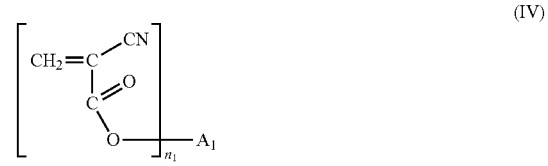

where $A_1$ is an organic residue
$n_1$ is a whole number from 1 to 6.

15. The self-repairing material according to claim 14, characterised in that at least one polymerisable compound is selected from the group consisting of:
methyl cyanoacrylate,
ethyl cyanoacrylate,
diethyl 3,3'-(1,4-phenylene)bis(2-cyanacrylate),
ethyl-3-(3-chloro-4-methoxyphenyl)-2-cyanoacrylate,
ethyle-2-cyanoacrylate,
ethyle-3-(5-(2-chloro-5-(trifluoromethyl)phenyl)-2-furyl)-2-cyanoacrylate,
ethyl-3-(5-(2-chlorophenyl)-2-furyl)-2-cyanoacrylate,
ethyle-3-(5-(3-chlorophenyl)-2-furyl)-2-cyanoacrylate,
ethyle-3-(5-(4-chlorophenyl)-2-furyl)-2-cyanoacrylate,
3-(5-bromo-2-furyl)-2-cyanoacrylate and
3-(5-(4-(aminosulphonyl)phenyl)-2-furyl)-2-cyanoacrylate.

16. The self-repairing material according to at least one of claims 1 to 2, characterised in that in the case of the polymerisation-initiating agent naturally present in the environment being ambient relative humidity, at least one polymerisable compound is selected from the group consisting of monomers, and/or oligomers, and and/or pre polymers of the plurifunctional isocyanate compounds of formula (V):

where R is an aromatic or aliphatic organic group which may contain isocyanate or other functions.

17. The self-repairing material according to claim 16, characterised in that at least one polymerisable compound is isocyanate and is chosen from the group consisting of: 1,6 hexamethylene diisocyanate. methylene diphenyl diisocyanate, toluene-2,4-diisocyanate, toluene-2,6-diisocyanate, isophorone diisocyanate, naphthylene-1,5 diisocyanate, para-xylylene diisocyanate, m-tetramethylxyene diisocyanate, meta-xylylene diisocyanate, dicyclohexylmethane4,4'-diisocyanate, triphenylmethane triisocyanate, 1,6,11-undecane triisocyanate, 2,2-bis (isocyanatomethyl propyl isocyanate and 4-(isocyanatomethyl)-1,7-heptyl diisocyanate.

18. The self-repairing material according to at least one of the claim 1 or 2, characterised in that in a case where the polymerisation-initiating agent naturally present in the solicited environment is ambient relative humidity, at least one polymerisable compound is chosen from the group consisting of monomers, and/or oligomers and/or pre-polymers of silane of formula (VI):

where:
n is 0 or 1
R is a methyl or ethyl group
X is a functional group chosen for its compatibility with the resin whose adhesion the silane is destined to improve, and may be a vinyl, acrylic, amino, mercapto or epoxy group.

19. The self-repairing material according to claim 18, characterised in that at least one silane compound is chosen from the group consisting of: aminopropyl trimethoxysilane, vinyl trimethoxysilane, methacryloxy trimethoxysilane, glycidooxypropyltrimethoxysilane, mercaptopropyl trimethoxysilane, (N-2-aminoethyl)aminopropyltrimethoxysilane, tetraethoxysilane.

20. The self-repairing material according to at least one of claim 1 or 2, characterised in that in a case where the polymerisation-initiating agent naturally present in the environment is atmospheric oxygen, at least one polymerisable compound is selected from the group consisting of drying or semi-drying oils, composed of saturated, mono- and polyunsaturated linear fatty acid glyceryl esters.

21. The self-repairing material according to claim 20, characterised in that at least one polymerisable compound is selected from a group consisting of linseed oil, perilla seed oil, stillingia oil, walnut oil, tung oil, oiticica oil, isano oil, dehydrated castor oil, camelina seed oil, safflower seed oil, cottonseed oil, poppyseed oil, grape seed oil, soybean oil and sunflower seed oil.

22. The self-repairing material according to at least one of claim 1 or 2, characterised in that the microcapsules containing said polymerisable composition either on its own or in a mixture with a radical-based or cationic polymerisation initiator, have diametral dimensions at intervals between 0.1 μm and 500 μm.

* * * * *